(12) United States Patent
Urabe et al.

(10) Patent No.: US 8,226,256 B2
(45) Date of Patent: Jul. 24, 2012

(54) DISPLAY UNIT

(75) Inventors: Tetsuo Urabe, Kanagawa (JP); Yuichi Iwase, Kanagawa (JP); Koichi Tsukihara, Kanagawa (JP); Yoichi Tomo, Kanagawa (JP); Toshihiro Fukuda, Kanagawa (JP)

(73) Assignee: Sony Corporation, Tokyo (JP)

( * ) Notice: Subject to any disclaimer, the term of this patent is extended or adjusted under 35 U.S.C. 154(b) by 389 days.

(21) Appl. No.: 11/680,787

(22) Filed: Mar. 1, 2007

(65) Prior Publication Data

US 2008/0253132 A1  Oct. 16, 2008

(30) Foreign Application Priority Data

Mar. 13, 2006 (JP) ................ P2006-067550

(51) Int. Cl.
*G09F 13/04* (2006.01)
(52) U.S. Cl. ............ 362/97.1; 362/97.3; 362/97.2; 362/330; 362/331; 349/62; 349/63
(58) Field of Classification Search ........ 362/97.1–97.3, 362/327, 330–333, 339, 236–237, 240–241, 362/244, 245, 247; 349/62–64
See application file for complete search history.

(56) References Cited

U.S. PATENT DOCUMENTS

| | | | | |
|---|---|---|---|---|
| 5,396,350 A | * | 3/1995 | Beeson et al. | 349/62 |
| 5,428,468 A | * | 6/1995 | Zimmerman et al. | 349/62 |
| 5,839,823 A | * | 11/1998 | Hou et al. | 362/327 |
| 6,997,595 B2 | * | 2/2006 | Mi et al. | 362/626 |
| 7,345,824 B2 | * | 3/2008 | Lubart et al. | 359/641 |
| 7,400,805 B2 | * | 7/2008 | Abu-Ageel | 385/120 |
| 7,463,315 B2 | * | 12/2008 | Chang | 349/61 |
| 2006/0038752 A1 | * | 2/2006 | Winters | 345/76 |
| 2006/0104084 A1 | * | 5/2006 | Amemiya et al. | 362/561 |
| 2006/0146563 A1 | * | 7/2006 | Chen | 362/561 |
| 2008/0225509 A1 | * | 9/2008 | Greiner | 362/84 |

FOREIGN PATENT DOCUMENTS

| | | |
|---|---|---|
| JP | 2003-086358 A | 3/2003 |
| JP | 2003-282255 A | 10/2003 |
| JP | 2003-282260 A | 10/2003 |
| JP | 2003-303677 | 10/2003 |
| JP | 2003-347052 A | 12/2003 |
| JP | 2004-164912 A | 6/2004 |
| JP | 2004-199953 A | 7/2004 |
| JP | 3573393 | 7/2004 |
| JP | 2004-259607 A | 9/2004 |
| JP | 2005-332614 | 12/2005 |

OTHER PUBLICATIONS

Japanese Patent Office, Office Action issued in Patent Application JP 2006-067550, on Feb. 17, 2010.

* cited by examiner

*Primary Examiner* — Robert May
(74) *Attorney, Agent, or Firm* — SNR Denton US LLP

(57) ABSTRACT

A display unit which the view angle is limited and the front luminance is improved is provided. The display unit includes a display device, and a light guiding part which is provided to face the display device, has an incident face on the side opposing to the display device, an emitting face on the opposite side of the display device, and a reflective face on the side face, and has a cross section expanding from the incident face to the emitting face.

6 Claims, 12 Drawing Sheets

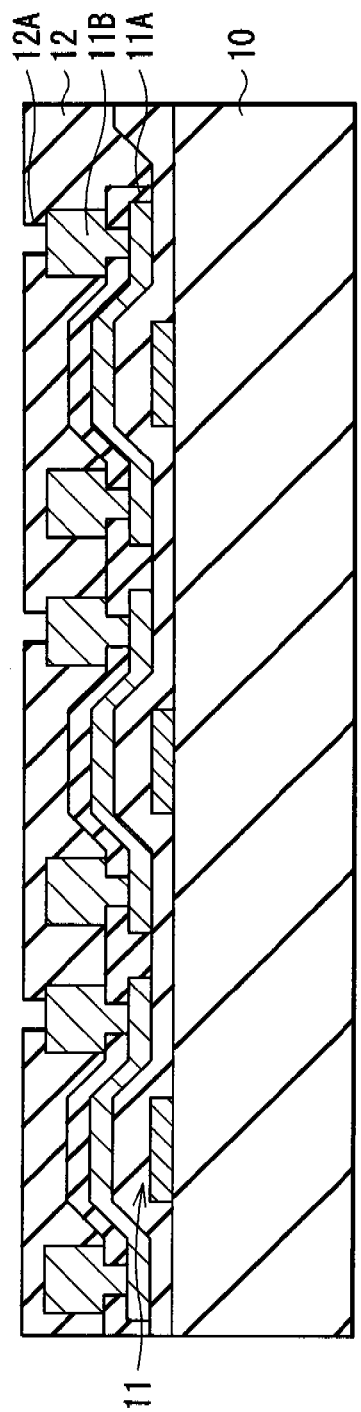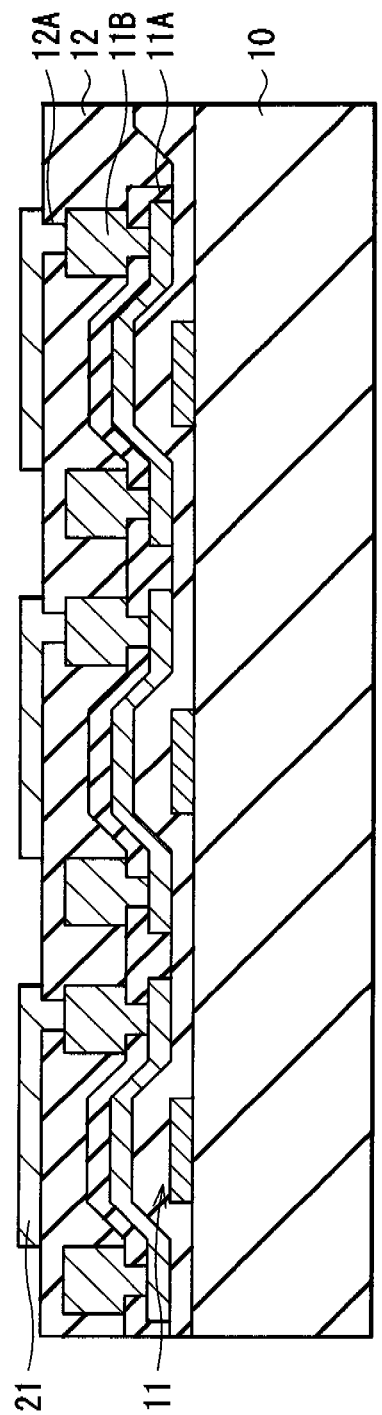

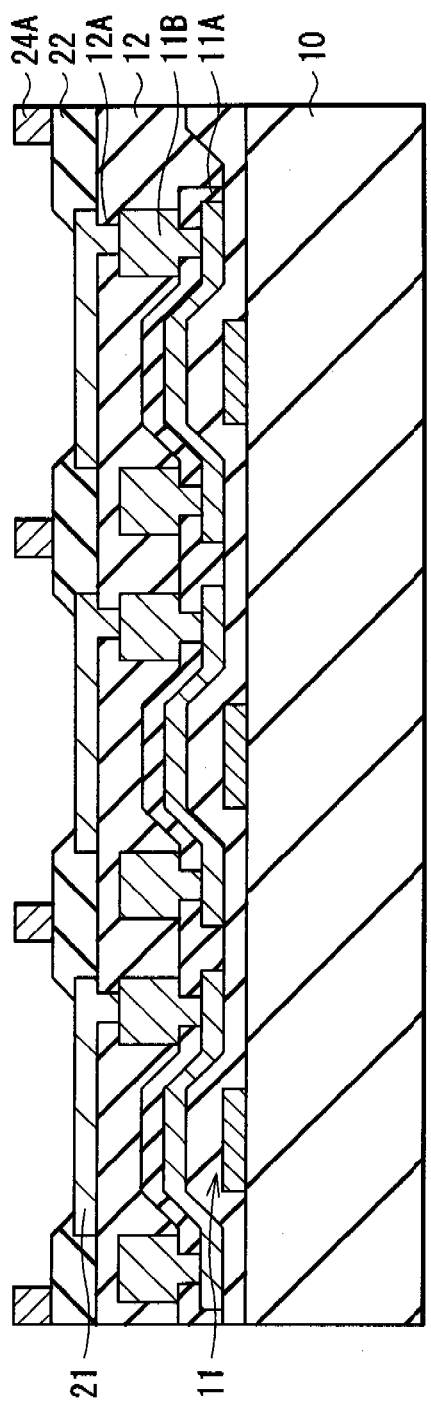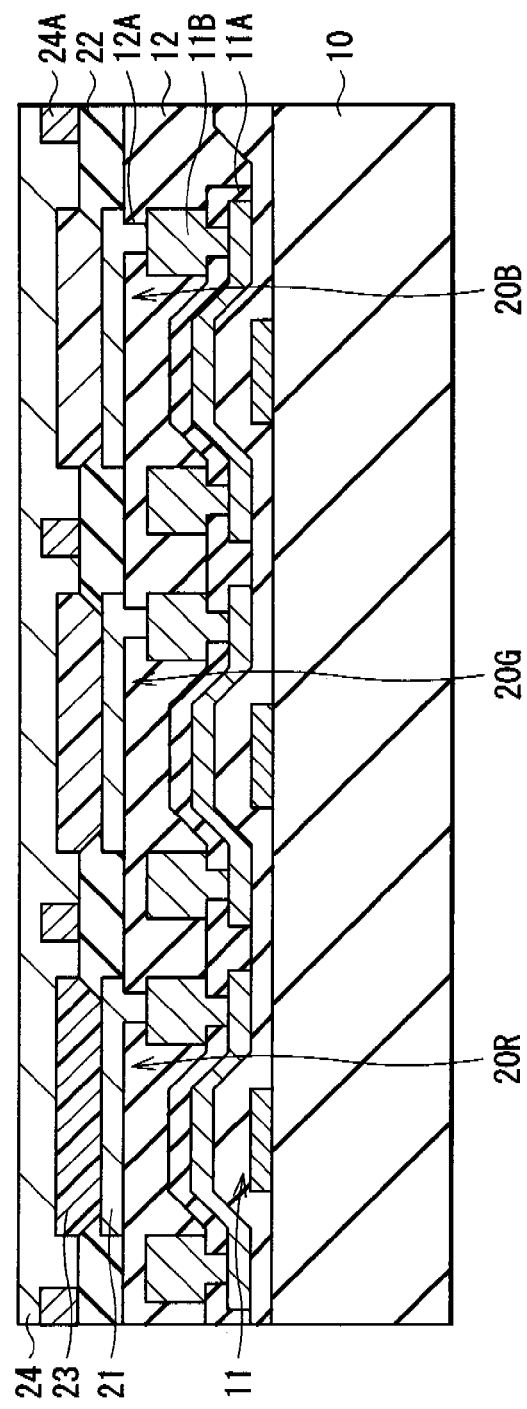
FIG. 14A
FIG. 14B

DISPLAY UNIT

CROSS REFERENCES TO RELATED APPLICATIONS

The present invention contains subject matter related to Japanese Patent Application JP 2006-067550 filed in the Japanese Patent Office on Mar. 13, 2006, the entire contents of which being incorporated herein by reference.

BACKGROUND OF THE INVENTION

1. Field of the Invention

The present invention relates to a display unit suitable for mobile devices.

2. Description of the Related Art

For the display mounted on the mobile devices, it is necessary that high quality images with high visibility are displayed while the battery duration is maintained as long as possible. However, the two necessities are generally conflicting. That is, to improve visibility, the luminance needs to be improved. However, the improved luminance leads to increase in the electrical power consumption. When the electrical power consumption is increased, the battery duration becomes short. Otherwise, to realize long operation of the battery, the weight thereof becomes high, leading to significant deterioration of the commercial value of the mobile device.

SUMMARY OF THE INVENTION

It is often the case that mobile devices are used in an outside place where many people gather and people develop a strong tendency to feel nervous when others might view the screen thereof. Therefore, intentionally limiting the view angle of the display has become rather an added value. For example, it is popular that a film for limiting the view angle is attached on the screen of the cellular phone.

However, in the currently general liquid crystal display, the light is emitted from the backlight at the constant intensity. Therefore, limiting the view angle as above does not lead to reduction of the electrical power consumption. In addition, it is inevitable to decrease the visibility, which is caused by attaching the film thereon.

Further, in the past, it has been proposed as follows for self light emitting devices such as an EL (Electroluminescence) device and a PDP (Plasma Display Panel) device. That is, a partition wall is provided in a transparent substrate, light emitted from a light emitting layer at an angle larger than the critical angle is diffused and reflected by the partition wall, and thereby the visibility is improved (for example, refer to Japanese Unexamined Patent Application Publication No. 2003-303677). However, such a partition wall of the related art is formed perpendicular to the light extraction face. Therefore, it is difficult to limit the emitting angle of the light which is diffused and reflected by the partition wall. Thus, it is difficult to intensify the luminance in the front direction to the light extraction face (hereinafter referred to as "front luminance").

In view of the foregoing, in the invention, it is desirable to provide a display unit capable of limiting the view angle to improve convenience and of improving the front luminance.

According to an embodiment of the invention, there is provided a display unit including a display device and a light guiding part which is provided to face the display device, has an incident face on the side opposing to the display device, an emitting face on the opposite side of the display device, and a reflective face on the side face, and has a cross section expanding from the incident face to the emitting face.

In the display unit according to the embodiment of the invention, the cross section of the light guiding part is the shape expanding from the incident face to the emitting face, and the side face is the reflective face. Therefore, even when the total amount of light emission is equal, the emitting angle range is narrowed, and the light concentrates in the front direction to the emitting face. Therefore, the view angle is limited, and the front luminance is improved.

According to the display unit of the embodiment of the invention, the cross section of the light guiding part is in the shape expanding from the incident face to the emitting face, and the side face is the reflective face. Therefore, the light extraction direction can be limited to limit the view angle, and the front luminance can be improved. Consequently, the invention is particularly suitable for the usage necessitating privacy security of the display content such as mobile devices.

Other and further objects, features and advantages of the invention will appear more fully from the following description.

BRIEF DESCRIPTION OF THE DRAWINGS

FIGS. 13A and 13B are cross sections showing a method of manufacturing the display unit shown in FIG. 11 in order of steps;

FIGS. 14A and 14B are cross sections showing steps following steps of FIGS. 13A and 13B.

DETAILED DESCRIPTION OF THE PREFERRED EMBODIMENT

An embodiment of the invention will be hereinafter described in detail with reference to the drawings.

Figure 1:
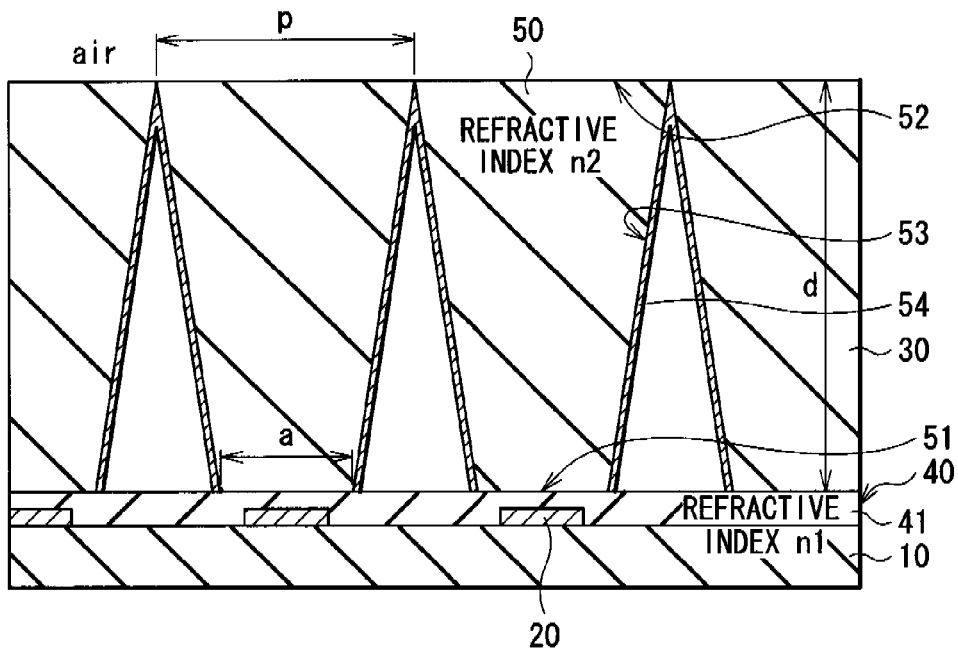
FIG. 1 is a view showing a configuration of a display unit according to an embodiment of the invention.

FIG. 1 shows a cross sectional configuration of a display unit according to an embodiment of the invention. The display unit is mounted on, for example, mobile devices. Display devices 20 are provided on a driving substrate 10. On the side of the driving substrate 10 where the display devices 20 are provided, a sealing substrate 30 is arranged to face the display device 20. The space between the driving substrate 10 and the sealing substrate 30 is totally filled with an intermediate layer 40.

The driving substrate 10 is made of, for example, an insulating material such as glass.

The display device 20 may be, for example, a self light emitting device such as EL (organic light emitting device) and PDP, or may be a liquid crystal device including a liquid crystal layer and a backlight.

The sealing substrate 30 seals the display devices 20 together with the intermediate layer 40. The sealing substrate 30 is made of a material transparent to the light from the display device 20 such as glass and a plastic resin such as acryl and PMMA (polymethylmethacrylate).

The sealing substrate 30 is provided with a light guiding part 50 opposing to each display device 20. The light guiding part 50 has an incident face 51 on the face opposing to the display device 20 and an emitting face 52 on the other side thereof. The light guiding part 50 has, for example, a trapezoid cross section which expands from the incident face 51 to the emitting face 52. A side face 53 thereof is provided with a reflective film 54. Thereby, the display unit can limit the light extraction direction to limit the view angle, and also can improve the front luminance.

As a material of the reflective film 54, for example, a simple substance or an alloy of metals such as aluminum (Al) and silver (Ag) can be cited. Otherwise, the reflective film 54 may be formed of a dielectric multilayer film.

Further, the view angle $\alpha$ of the display device 20 satisfies Mathematical formula 1.

$$\sin \alpha \geq n_2 \sin [a \tan \{(p+a)/2d\}]$$

$$\sin \alpha \geq n_2 \sin u_2 = n_2 \sin(au_1/p) \quad \text{Mathematical formula 1}$$

In Mathematical formula 1, $n_2$ represents the refractive index of the light guiding part 50, a represents the width of the incident face 51, p represents the width of the emitting face 52, d represents the distance between the incident face 51 and the emitting face 52, $u_1$ represents the maximum angle of the light entering the incident face 51, $u_2$ represents the maximum angle of the light which is reflected by the reflective film 54 of the side face 53 and then is emitted from the emitting face 52.

To limit the view angle means that all light is emitted in the air at an angle within the range of angle $\alpha$. To that end, it is necessary that both of light which is not reflected by the reflective film 54 and is directly emitted in the air and light which is reflected by the reflective film 54 one or more times and then is emitted in the air fall within angle $\alpha$ at the same time.

Figure 3:
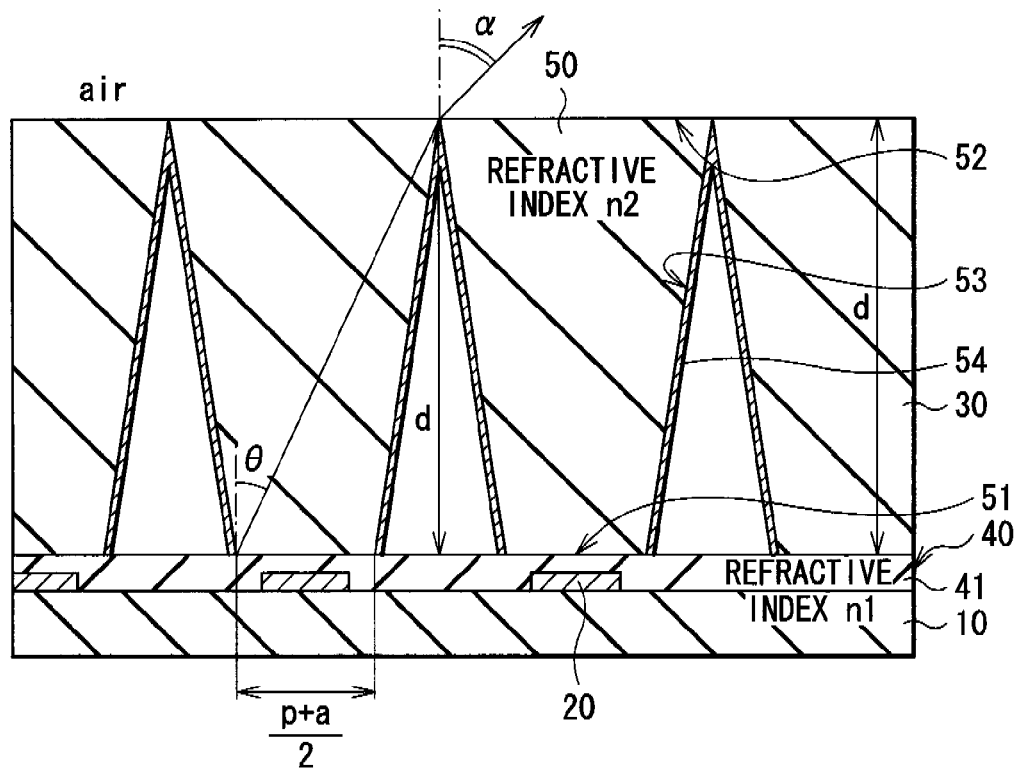
FIG. 3 is a view for explaining conditions that light which is not reflected by a reflective film and directly emitted in the air falls within angle $\alpha$.

The first formula of Mathematical formula 1 shows conditions that light which is not reflected by the reflective film 54 and is directly emitted in the air falls within angle $\alpha$ (light 1). That is, as shown in FIG. 3, when the maximum angle of the light 1 is 0, Mathematical formula 2 is established. Further, Mathematical formula 3 is established based on Snell's law. Therefore, the conditions that the light 1 is emitted at an angle within the range of angle $\alpha$ are expressed as the first formula of Mathematical formula 1.

$$\tan \theta = (p+a)/2d \quad \text{Mathematical formula 2}$$

$$\sin \alpha \geq n_2 \sin \theta \quad \text{Mathematical formula 3}$$

Figure 4:
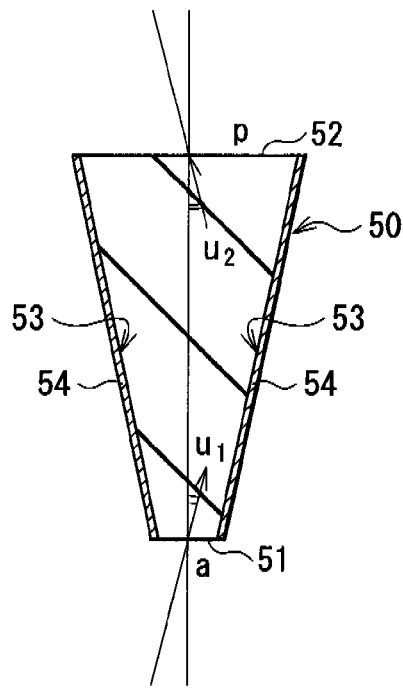
FIG. 4 is a view for explaining the relation between the maximum angle $u_1$ of light entering an incident face and the maximum angle $u_2$ of light which is reflected by the reflective film one or more times and then is emitted from an emitting face.
Figure 5:
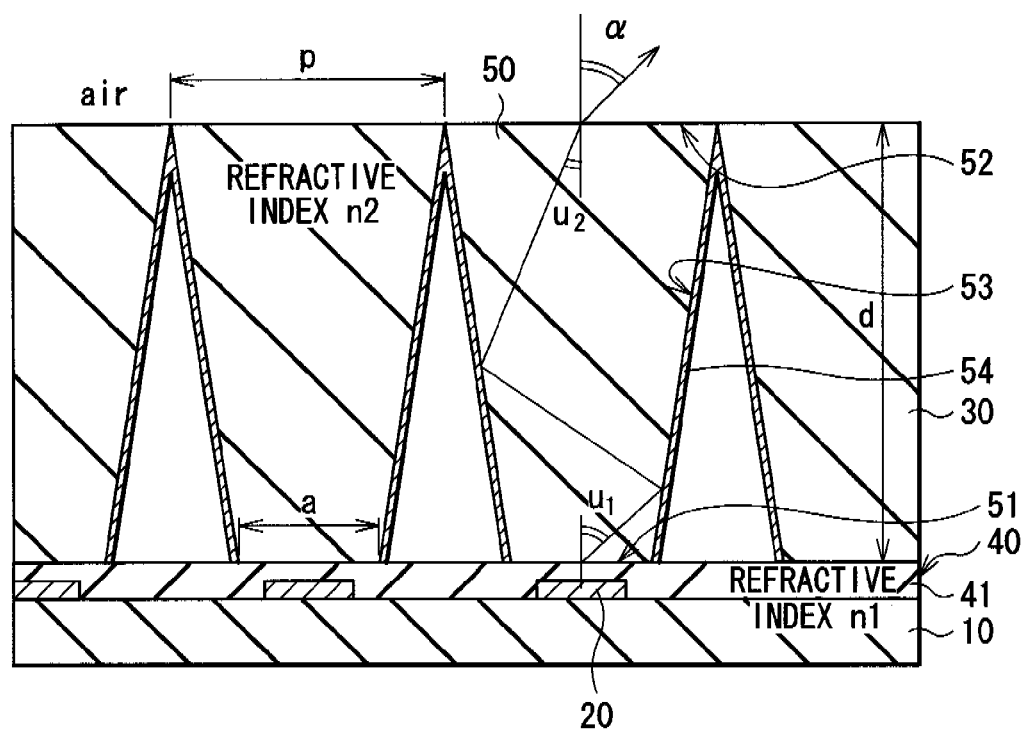
FIG. 5 is a view for explaining conditions that light which is reflected by the reflective film one or more times and emitted in the air is emitted at an angle within the range of angle $\alpha$.

The second formula of Mathematical formula 1 shows conditions that light which is reflected by the reflective film 54 one or more times and then is emitted in the air falls within angle $\alpha$ (light 2). That is, as shown in FIG. 4, the relation between the maximum angle $u_1$ of the light entering the incident face 51 and the maximum angle $u_2$ of the light which is reflected by the reflective film 54 one or more times and then is emitted from the emitting face 52 is expressed as shown in Mathematical formula 4. As shown in FIG. 5, by applying Mathematical formula 4 to the light guiding part 50 considering the refractive index $n_2$ and combining Snell's law therewith, the second formula of Mathematical formula 1 is obtained.

$$au_1 = pu_2 \quad \text{Mathematical formula 4}$$

where $u_2$ is equal to or less than the critical angle.

In the second formula of Mathematical formula 1, $u_1$ is the maximum angle of the light entering the light guiding part 50 with the refractive index $n_2$ from the display device 20. $u_1$ is not 90 deg, since discussion is made on the case that the luminance is previously set to almost 0 in the case of 90 deg or less by an after-mentioned resonator structure, a lens or the like.

Figure 2:
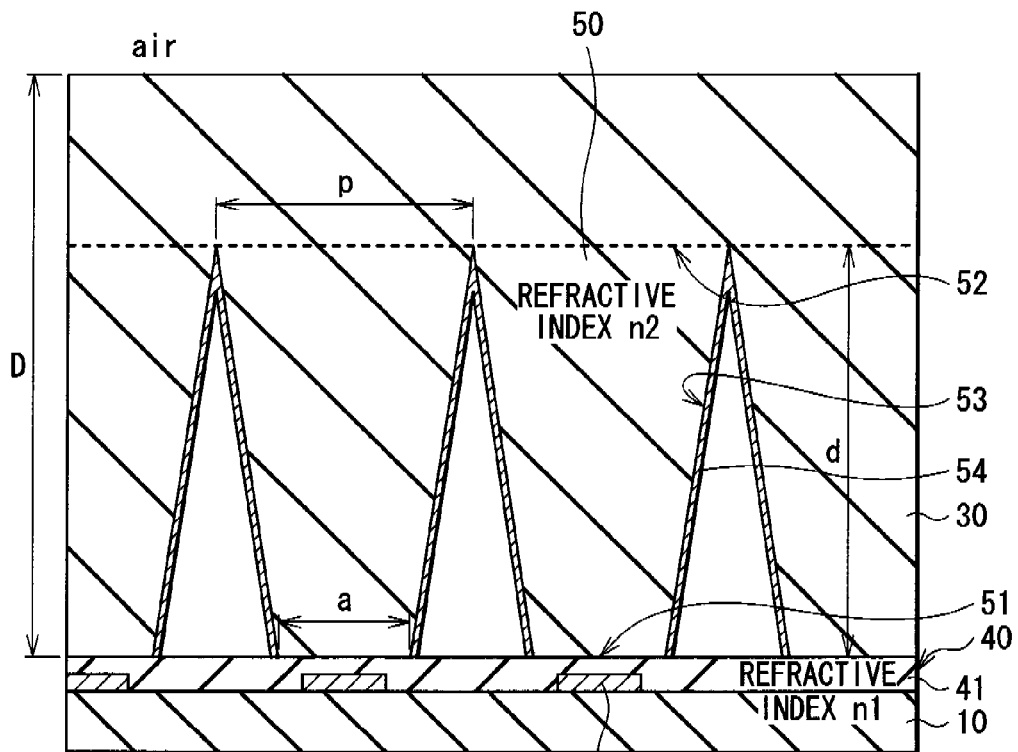
FIG. 2 is a view showing a modification of FIG. 1.

In reality, the width a of the incident face 51, the width p of the emitting face 52, and the distance d between the incident face 51 and the emitting face 52 are preferably set so that the view angle a becomes, for example, 30 deg to 60 deg. The distance d is not necessarily identical with the thickness D of the sealing substrate 30. As shown in FIG. 2, the thickness D may be larger than the distance d. The refractive index of the intermediate layer 40 is $n_1$.

The region surrounded by the reflective film 54 of the adjacent light guiding parts 50 may be composed of the air, or may be filled with the intermediate layer 40 at least in part.

The intermediate layer 40 has an adhesive layer 41 made of, for example, a thermosetting resin or an ultraviolet curing resin. The driving substrate 10, the display device 20 and the sealing substrate 30 are bonded together over the whole area by the adhesive layer 41. The intermediate layer 40 may have a protective film (not shown) made of, for example, silicon nitride (SiNx) for protecting the display device 20 between the display device 20 and the adhesive layer 41 if necessary.

Figure 6:
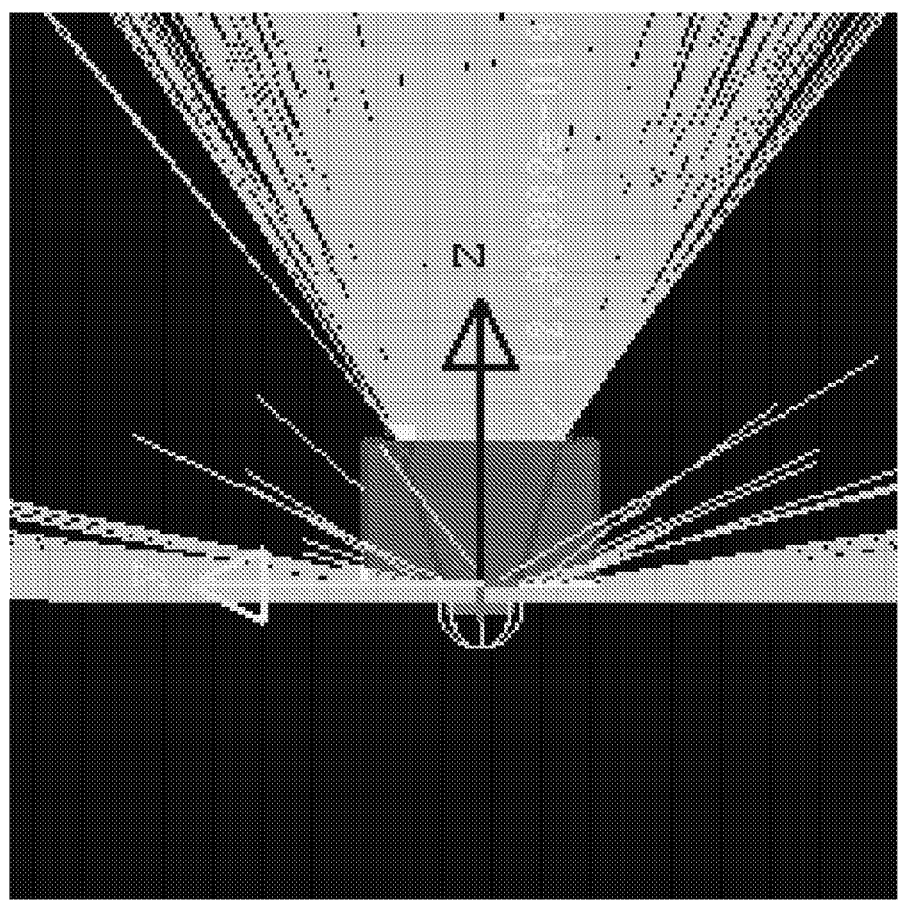
FIG. 6 is a view showing an illumination analysis result based on a light guiding part shown in FIG. 1.
Figure 7:
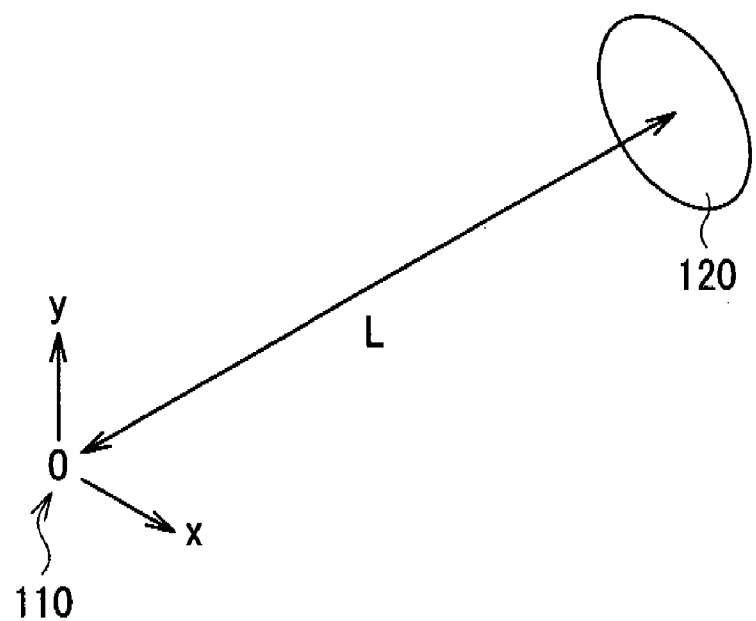
FIG. 7 is a perspective view showing an arrangement of a light emitting point and a light receiver used for the illumination analysis of FIG. 6.
Figure 8:
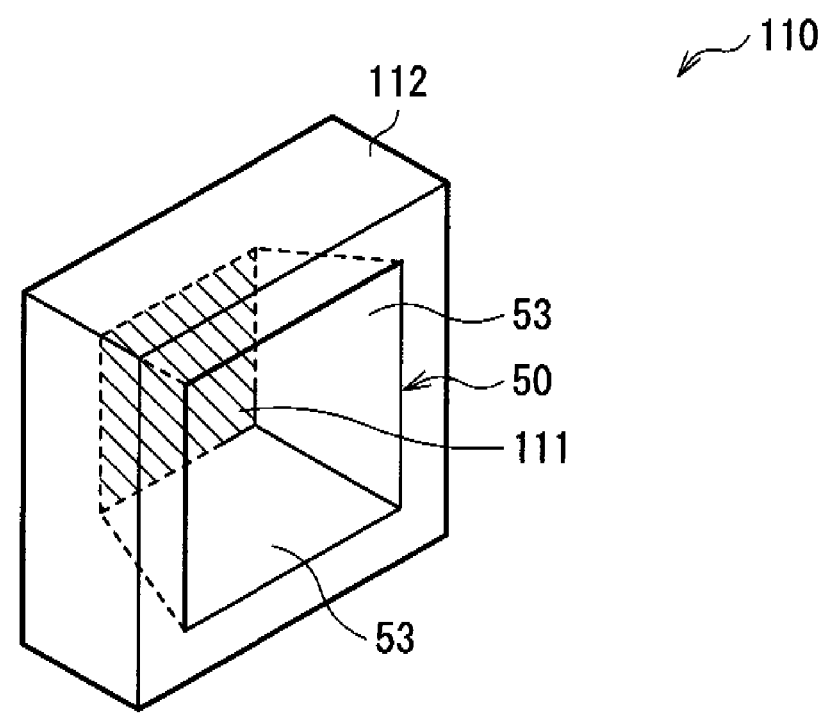
FIG. 8 is a perspective view showing a structure of the light emitting point shown in FIG. 7.

FIG. 6 shows an illumination analysis result of a uniform surface light source in the case that the view angle is limited by the light guiding part 50. As the analysis condition, as shown in FIG. 7, a light emitting point 110 and a light receiver 120 corresponding to eyes are arranged at a distance L of 50 mm. As shown in FIG. 8, in the light emitting point 110, a square uniform surface light source 111, 0.05 mm on a side, and a partition wall 112 provided with the foregoing light guiding part 50 are arranged at intervals of 0.01 mm. The incident face 51 of the light guiding part 50 is in the shape of a square, 0.05 mm on a side, and the slope angle of the side face 53 is 17 deg. The diameter $\phi$ of the light receiver 120 is 10 mm.

Figure 9:
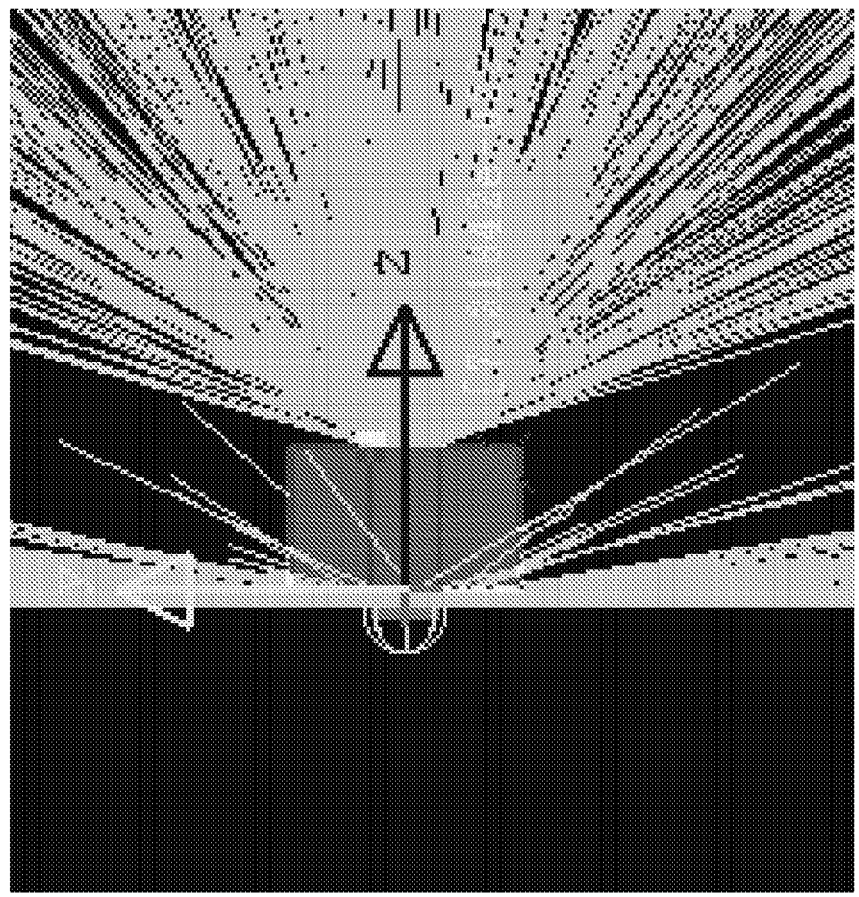
FIG. 9 is a view showing an illumination analysis result when the side face of the light guiding part is perpendicular.
Figure 10:
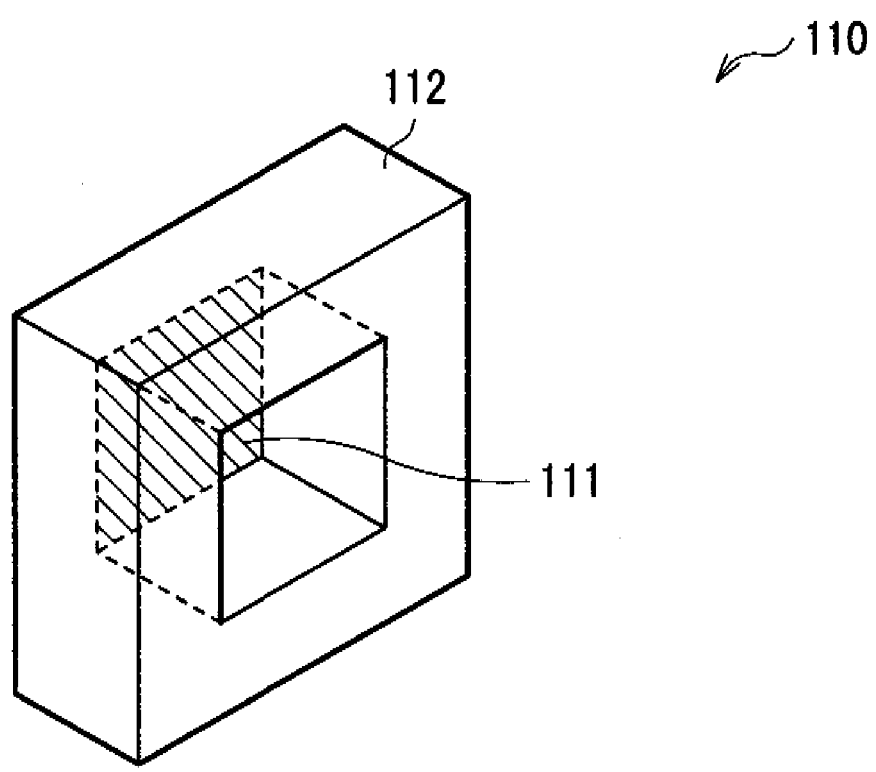
FIG. 10 is a perspective view showing a structure of a light emitting point used for the illumination analysis of FIG. 9.

FIG. 9 shows an illumination analysis result under the conditions similar to those of FIG. 6, in the case that the side face of the light guiding part 50 is perpendicular as shown in FIG. 10.

Comparing FIG. 6 to FIG. 9, it is found that in FIG. 6, the light emitted from the light guiding part 50 concentrates in the front direction and effects to limit the light extraction direction are more superior compared to in FIG. 9. That is, it is found that when the light guiding part 50 has a cross section expanding from the incident face 51 to the emitting face 52, the view angle can be limited. Further, the inventors performed illumination analysis in the case that the uniform surface light source 111 not provided with the partition wall 112, that is, not provided with the light guiding part 50 was singly set. In the result, it was confirmed that in FIG. 6, the cross section intensity peak value of the emitting light became about sixfold compared to that in the case that the uniform surface light source 111 was provided singly. Therefore, it is found that by using the light guiding part 50, the front luminance can be improved about sixfold, and thereby the electrical power consumption could be decreased to about one sixth. In the foregoing illumination analysis, the uniform surface light source 111 was used as the display device 20. However, when the display device 20 having the after-mentioned resonator structure is used, almost similar result can be obtained.

Figure 11:
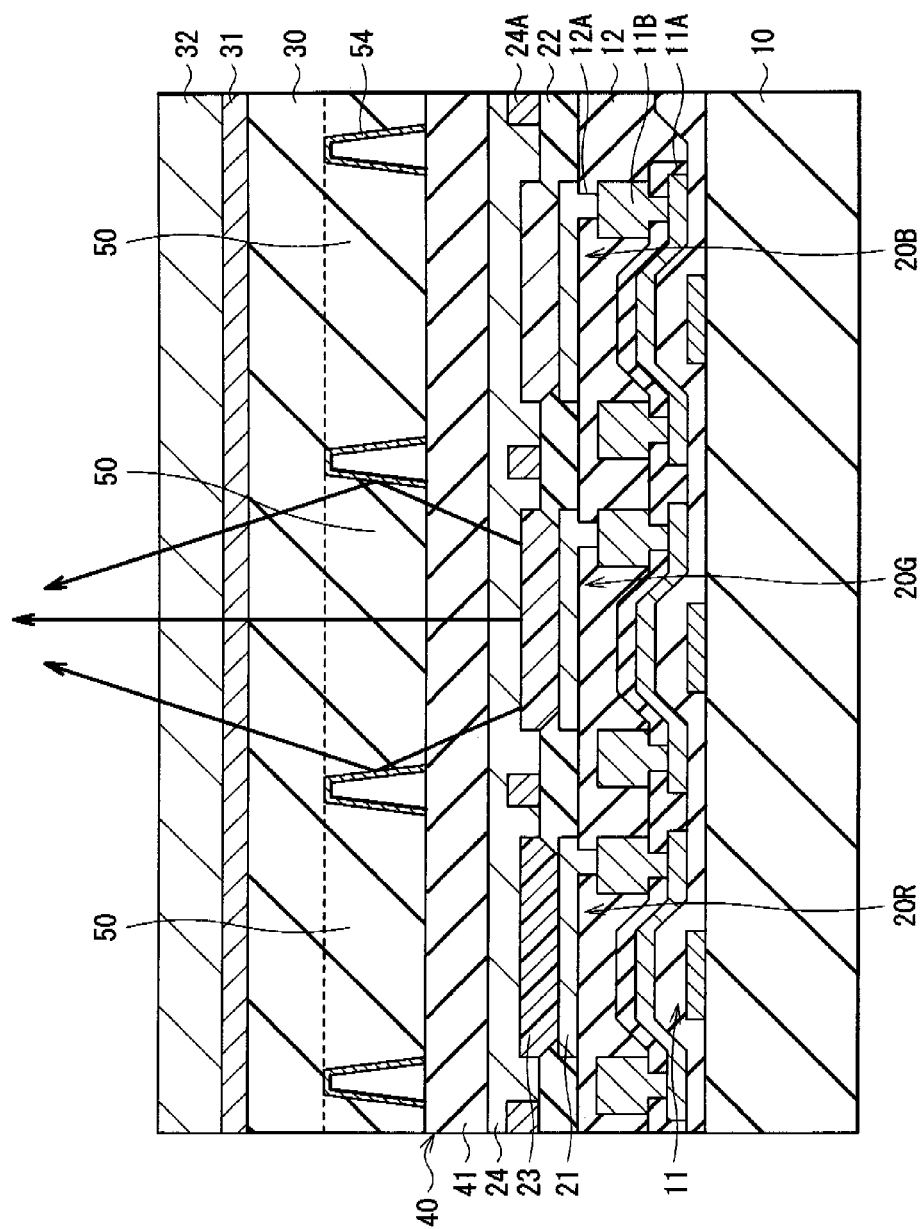
FIG. 11 is a cross section showing a specific example of the display unit shown in FIG. 1.

FIG. 11 shows an example of a specific configuration of the display unit described above. The display unit is used as an ultra-thin organic light emitting color display unit or the like. In the display unit, an organic light emitting device 20R generating red light, an organic light emitting device 20G generating green light, an organic light emitting device 20B generating blue light are sequentially provided in a matrix state as a whole over the driving substrate 10 with a TFT 11 and a planarizing layer 12 in between.

A gate electrode (not shown) of the TFT 11 is connected to a not-shown scanning circuit. A source and a drain (either not shown) are connected to a wiring 11B provided with an interlayer insulating film 11A made of, for example, silicon oxide or PSC (Phos-Silicate Glass) in between. The wiring 11B is connected to the source and the drain of the TFT 11 through a not-shown connection hole provided in the interlayer insulating film 11A, and is used as a signal line. The wiring 11B is made of, for example, aluminum (Al) or an aluminum (Al)-copper (Cu) alloy. The structure of the TFT 11 is not particularly limited. For example, the structure thereof may be bottom gate type or top gate type.

The planarizing layer 12 is a foundation layer for planarizing the surface of the driving substrate 10 formed with the TFT 11 and for uniformly forming the film thickness of each layer of the organic light emitting devices 20R, 20G, and 20B. The planarizing layer 12 is provided with a connection hole 12A for connecting a first electrode 21 of the organic light emitting devices 20R, 20G, and 20B to the wiring 11B. Since the planarizing layer 12 is formed with the fine connection hole 12A, the planarizing layer 12 is preferably made of a material with a favorable pattern precision. As a material of the planarizing layer 12, an organic material such as polyimide and an inorganic material such as silicon oxide ($SiO_2$) can be cited.

In the organic light emitting devices 20R, 20G, and 20B, for example, the first electrode 21 as an anode, an insulating film 22, an organic layer 23 including a light emitting layer, and a second electrode 24 as a cathode are layered in this order from the driving substrate 10 side. On the second electrode 24, the foregoing protective film (not shown) is formed if necessary.

The first electrode 21 also functions as a reflective layer, and desirably has a high refractive index as much as possible in order to improve light emitting efficiency. The first electrode 21 has, for example, a thickness in the lamination direction (hereinafter simply referred to as thickness) from 100 nm to 1000 nm, and is made of a simple substance or an alloy of metals such as chromium (Cr), gold (Au), platinum (Pt), nickel (Ni), copper (Cu), tungsten (W), and silver (Ag).

The insulating film 22 is for securing insulation between the first electrode 21 and the second electrode 24, and for accurately obtaining a desired shape of the light emitting region. For example, the insulting film 22 is made of a photosensitive resin. The insulating film 22 is provided with an opening corresponding to the light emitting region. Though the organic layer 23 and the second electrode 24 are continuously provided on the insulating film 22 as well, light is emitted only from the opening of the insulating film 22.

Figure 12:
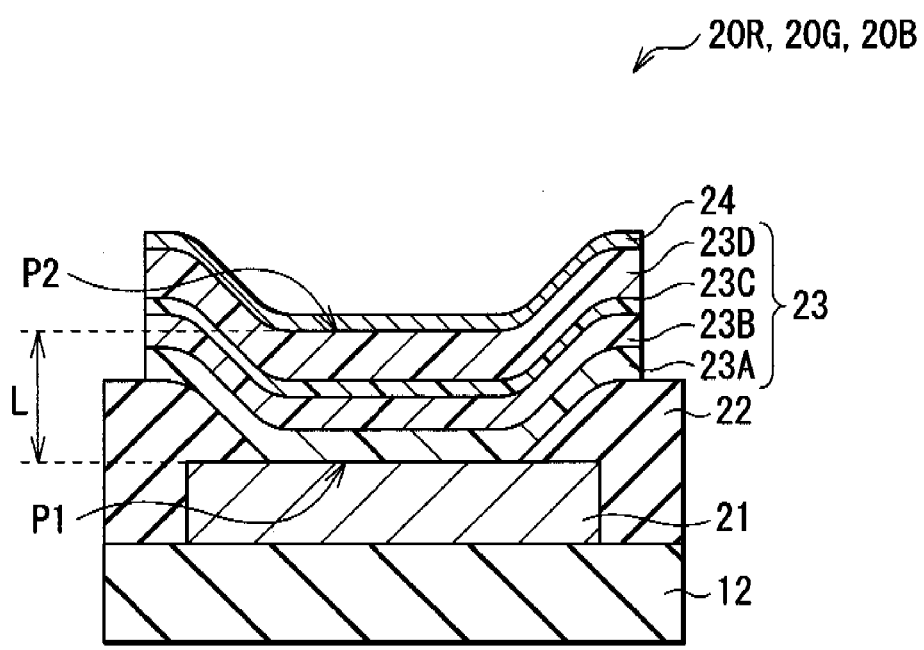
FIG. 12 is a cross section showing a structure of an organic light emitting device shown in FIG. 11.

As shown in FIG. 12, for example, the organic layer 23 has a structure in which a hole injection layer 23A, a hole transport layer 23B, a light emitting layer 23C, and an electron transport layer 23D are layered in this order from the first electrode 21 side. The layers except for the light emitting layer 23C may be provided according to needs. The organic layers 23 may have a different structure according to the light emitting color of the organic light emitting devices 20R, 20G, and 20B. The hole injection layer 23A is for improving hole injection efficiency and functions as a buffer layer to prevent leakage. The hole transport layer 23B is for improving efficiency to transport holes into the light emitting layer 23C. The light emitting layer 23C is for generating light due to electron-hole recombination by applying the electric field. The electron transport layer 23D is for improving efficiency to transport electrons into the light emitting layer 23C. It is possible to provide an electron injection layer (not shown) made of LiF, $Li_2O$ or the like between the electron transport layer 23D and the second electrode 24.

The hole injection layer 23A of the organic light emitting device 20R is, for example, from 5 nm to 300 nm thick, and is made of 4,4', 4"-tris(3-methylphenylamino)triphenyl amine (m-MTDATA) or 4,4', 4"-tris(2-naphthylphenylamino)triphenyl amine (2-TNATA). The hole transport layer 23B of the organic light emitting device 20R is, for example, from 5 nm to 300 nm thick, and is made of bis[(N-naphthyl)-N-phenyl] benzidine (α-NPD). The light emitting layer 23C of the organic light emitting device 20R is, for example, from 10 nm to 100 nm thick, and is made of a material in which 40 volume % of 2,6-bis[4-[N-(4-metoxyphenyl)-N-phenyl] aminostyril] naphthalene-1,5-dicarbonitrile (BSN-BCN) is mixed with 8-quinolinol aluminum complex ($Alq_3$). The electron transport layer 23D of the organic light emitting device 20R is, for example, from 5 nm to 300 nm thick, and is made of $Alq_3$.

The hole injection layer 23A of the organic light emitting device 20G is, for example, from 5 nm to 300 nm thick, and is made of m-MTDATA or 2-TNATA. The hole transport layer 23B of the organic light emitting device 20G is, for example, from 5 nm to 300 nm thick, and is made of α-NPD. The light emitting layer 23C of the organic light emitting device 20G is, for example, from 10 nm to 100 nm thick, and is made of a material in which 3 volume % of coumarin 6 is mixed with $Alq_3$. The electron transport layer 23D of the organic light emitting device 20G is, for example, from 5 nm to 300 nm thick, and is made of $Alq_3$.

The hole injection layer 23A of the organic light emitting device 20B is, for example, from 5 nm to 300 nm thick, and is made of m-MTDATA or 2-TNATA. The hole transport layer 23B of the organic light emitting device 20B is, for example, from 5 nm to 300 nm thick, and is made of α-NPD. The light emitting layer 23C of the organic light emitting device 20B is, for example, from 10 nm to 100 nm thick, and is made of spiro 6Φ. The electron transport layer 23D of the organic light emitting device 20B is, for example, from 5 nm to 300 nm thick, and is made of $Alq_3$.

The second electrode 24 is, for example, from 5 nm to 50 nm thick, and is made of a simple substance or an alloy of metal elements such as aluminum (Al), magnesium (Mg), calcium (Ca), and sodium (Na). Specially, an alloy of magnesium and silver (MgAg alloy) or an alloy of aluminum (Al) and lithium (Li) (AlLi alloy) is preferable. The second electrode 24 is formed to cover all of the organic light emitting devices 20R, 20G, and 20B, and functions as a common electrode for the organic light emitting devices 20R, 20G, and 20B. To prevent voltage drop of the second electrode 24, it is preferable that an auxiliary electrode 24A is provided on the insulating film 22. The auxiliary electrode 24A is provided as if to fill the niche between the organic light emitting devices 20R, 20G, and 20B. The end thereof is connected to a not-shown stem-like auxiliary electrode as a generating line which is formed to surround the region provided with the organic light emitting devices 20R, 20G, and 20B in the periphery of the driving substrate 10. The auxiliary electrode 24A and the auxiliary electrode are, for example, composed of a single layer or a lamination structure made of a low-resistance conductive material such as aluminum (Al) and chromium (Cr).

The second electrode 24 also functions as a semi-transparent reflective layer. That is, the organic light emitting devices 20R, 20G, and 20B have a resonator structure to resonate the light generated in the light emitting layer 23C and extract the light from a second end P2, where the end face of the first electrode 21 on the light emitting layer 23C side is a first end P1, the end face of the second electrode 24 on the light emitting layer 23C side is the second end P2, and the organic layer 23 is a resonant portion. When the organic light emitting devices 20R, 20G, and 20B have the resonator structure as above, the light generated in the light emitting layer 23C produces multiple interference and works as a kind of narrow band-pass filter. Thereby, the half bandwidth of the spectrum of the light to be extracted is reduced, and the color purity can be improved. Outside light entering from the sealing substrate 30 side can be also attenuated by the multiple interferences. The reflectivity of the outside light in the organic light emitting devices 20R, 20G, and 20B can be extremely decreased by combining with a wave plate and a polarizing plate, or a color filter which will be described later.

To that end, it is preferable that the optical distance L between the first end P1 and the second end P2 of the resonator satisfies Mathematical formula 5, and a resonant wavelength of the resonator (peak wavelength of the spectrum of the light to be extracted) corresponds with the peak wavelength of the spectrum of the light desired to be extracted. In reality, the optical distance L is preferably selected to become the positive minimum value satisfying Mathematical formula 5.

$$(2L)/\lambda + \Phi/(2\pi) = m$$   Mathematical formula 5

In the formula, L represents the optical distance between the first end P1 and the second end P2, $\Phi$ represents the sum of the phase shift $\Phi_1$ of the reflected light generated at the first end P1 and the phase shift $\Phi_2$ of the reflected light generated at the second end P2 ($\Phi = \Phi_1 + \Phi_2$) (rad), $\lambda$ represents the peak wavelength of the spectrum of the light desired to be extracted from the second end P2 side, and m represents the value when L becomes a positive integer number. In Mathematical formula 5, the unit used for L and $\lambda$ may be common, for example, nm is used.

The sealing substrate 30 is provided with the light guiding part 50 described above. The side faces 53 of the adjacent light guiding parts 50 are not necessarily connected in the shape of the inverted V shape as shown in FIG. 1, but may be in the shape of a trapezoid in section.

Further, a wave plate 31 and a polarizing plate 32 are bonded with the sealing substrate 30 on the side opposite to the organic light emitting devices 20R, 20G, and 20B. Thereby, outside light reflection is blocked, and sufficient contrast is maintained. The sealing substrate 30 may be provided with the color filter (not shown) instead of the wave plate 31 and the polarizing plate 32. Thereby, the lowering of luminance may be prevented while the contrast is maintained.

The display unit can be manufactured, for example, as follows.

FIG. 13A to FIG. 15 show a method of manufacturing the display unit in the order of steps. The manufacturing method is a method to manufacture the display unit including the organic light emitting devices 20R, 20G, and 20B as shown in FIG. 11.

First, as shown in FIG. 13A, the TFT 11, the interlayer insulating film 11A, and the wiring 11B are formed over the driving substrate 10 made of the foregoing material. The planarizing layer 12 made of the foregoing material is formed over the whole area by, for example, spin coat method. Then, the planarizing layer 12 is patterned into a given shape by providing exposure and development. In addition, the connection hole 12A is formed and fired.

Next, as shown in FIG. 13B, the first electrode 21 made of the foregoing material is formed by, for example, sputtering method. Then, etching is made to form the first electrode 21 into a given shape.

Subsequently, as shown in FIG. 14A, the whole area of the driving substrate 10 is coated with a photosensitive resin, which is formed and shaped by, for example, photolithography to provide openings in the portion corresponding to the first electrode 21. The resultant is fired to form the insulating film 22.

After that, as shown in FIG. 14A, the auxiliary electrode 24A is formed on the insulating film 22 over the whole area of the driving substrate 10. The resultant is selectively etched by using, for example, lithography technology and patterned into a given shape.

After the auxiliary electrode 24A is formed, as shown in FIG. 14B, the hole injection layer 23A, the hole transport layer 23B, the light emitting layer 23C, the electron transport layer 23D, and the second electrode 24 which have the foregoing thickness and are made of the foregoing material are sequentially deposited by, for example, vapor deposition method to form the organic light emitting devices 20R, 20G, and 20B as shown in FIG. 12. Subsequently, a protective film (not shown) is formed on the organic light emitting devices 20R, 20G, and 20B if necessary.

Figure 15:
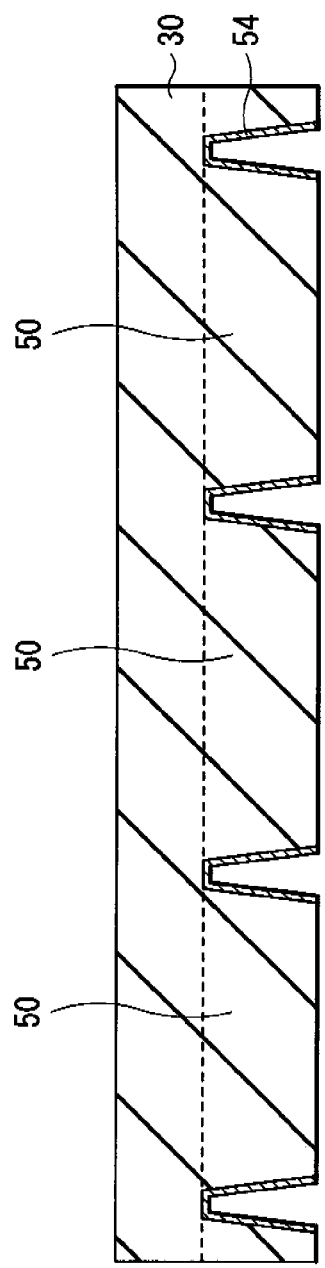
FIG. 15 is a cross section showing a step following steps of FIGS. 14A and 14B.

Further, as shown in FIG. 15, the sealing substrate 30 made of the foregoing material is provided with the light guiding part 50. The reflective film 54 made of the foregoing material is formed on the side face 53 of the light guiding part 50. The light guiding part 50 can be formed by using a stamper when the sealing substrate 30 is made of a plastic resin. The light guiding part 50 can be formed by grinding with a turning tool when the sealing substrate 30 is made of glass. The reflective film 54 can be formed by, for example, vapor deposition or sputtering.

After that, the adhesive layer 41 as the intermediate layer 40 is formed over the organic light emitting devices 20R, 20G, and 20B and the protective film covering the organic light emitting devices 20R, 20G, and 20B. The sealing substrate 30 is bonded to the resultant with the adhesive layer 41 in between. Then, the face of the sealing substrate 30 formed with the light guiding part 50 is arranged on the organic light emitting devices 20R, 20G, and 20B side. Finally, the wave plate 31 and the polarizing plate 32 are bonded on the surface of the sealing substrate 30. Consequently, the display unit shown in FIG. 11 is completed.

In the display unit, when a given voltage is applied between the first electrode 21 and the second electrode 24 in the respective organic light emitting devices 20R, 20G, and 20B, a current is injected in the light emitting layer 23C, electron-hole recombination occurs, and thereby light is generated. The light is multiply reflected between the first electrode 21 and the second electrode 24, and extracted through the second electrode 24 and the sealing substrate 30. In this embodiment, the cross section of the light guiding part 50 is in the shape expanding from the incident face 51 to the emitting face 52, and the reflective film 54 is provided on the side face 53. Therefore, even when the total amount of light emission is equal, the emitting angle range is narrowed, and the light concentrates in the front direction to the emitting face 52. Therefore, the view angle α is limited, and the front luminance is improved.

As above, in this embodiment, the cross section of the light guiding part 50 is in the shape expanding from the incident face 51 to the emitting face 52, and the reflective film 54 is provided on the side face 53. Therefore, the light-extraction direction can be limited to limit the view angle α, and the front luminance can be improved.

Further, energy consumed as light emission from the display device 20 is usable only by a user viewing the display unit. Thus, the electrical power consumption can be saved, leading to obtaining an added value that privacy of the user regarding the displayed content can be secured. Specially, in the case of the self light emitting display unit using the organic light emitting devices 20R, 20G, and 20B, by limiting the light emission extraction direction, the luminance in such a direction is sufficiently maintained and at the same time the total amount of the light emission can be reduced. Therefore, the electrical power consumption can be reduced.

While the invention has been described with reference to the embodiment, the invention is not limited to the foregoing embodiment, and various modifications may be made. For example, in the foregoing embodiment, the description has been given of the case in which the reflective film 54 is provided on the side face 53 to form the side face of the light guiding part 50 as a reflective face. However, it is possible that total reflection is made at the side face 53 by setting a refractive index difference between inside and outside of the light guiding part 50.

Further, in the foregoing embodiment, the description has been given of the case in which the side face 53 is a slope plane, and the light guiding part 50 has the trapezoid cross section. However, the side face 53 may be a curved face.

Further, in the foregoing embodiment, the description has been given of the case in which the resonator structure to multiply reflect the light generated in the light emitting layer 23C between the first end P1 and the second end P2 is formed. However, the invention can be applied to the organic light emitting devices 20R, 20G, and 20B not having the resonator structure.

In addition, the material, the thickness, the film-forming method, the film-forming conditions and the like of each layer are not limited to those described in the foregoing embodiment, but other material, other thickness, other film-forming method, and other film-forming conditions may be adopted. For example, in the foregoing embodiment, the description has been given of the case in which the first electrode 21, the organic layer 23, and the second electrode 24 are layered in this order form the driving substrate 10 side over the driving substrate 10, and the light is extracted from the light guiding part 50 provided in the sealing substrate 30. However, it is possible that the lamination order is reversed. That is, it is possible that the second electrode 24, the organic layer 23, and the first electrode 21 are sequentially layered from the driving substrate 10 side over the driving substrate 10, and the light is extracted from the driving substrate 10 side. In this case, the light guiding part 50 may be formed in the driving substrate 10.

Furthermore, for example, in the foregoing embodiment, the description has been given of the case in which the first electrode 21 is used as an anode and the second electrode 24 is used as a cathode. However, it is possible that the anode and the cathode are reversed. That is, it is possible that the first electrode 21 is used as a cathode and the second electrode 24 is used as an anode. Further, it is possible that the first electrode 21 is used as a cathode and the second electrode 24 is used as an anode, and the second electrode 24, the organic layer 23, and the first electrode 21 are sequentially layered from the driving substrate 10 side over the driving substrate 10, and the light is extracted from the driving substrate 10 side.

In addition, in the foregoing embodiment, the description has been specifically given of the structure of the organic light emitting devices 20R, 20G, and 20B. However, it is not always necessary to provide all layers, and other layer may be further provided. For example, a hole injection thin film layer made of chromium oxide (III) ($Cr_2O_3$), ITO (Indium-Tin Oxide:oxide mixed film of indium (In) and tin (Sn)) or the like may be provided between the first electrode 21 and the organic layer 23. Further, for example, the first electrode 21 may be a dielectric multilayer film.

Furthermore, in the foregoing embodiment, the description has been given of the case in which the second electrode 24 is made of the semi-transparent reflective layer. However, the second electrode 24 may have a structure in which the semi-transparent reflective layer and a transparent electrode are sequentially layered from the first electrode 21 side. The transparent electrode is for lowering the electric resistance of the semi-transparent reflective layer, and is made of a conductive material having sufficient translucency for the light generated in the light emitting layer 23C. As a material composing the transparent electrode, for example, ITO, or a compound containing indium, zinc (Zn), and oxygen is preferable. Thereby, even when film forming is made at the room temperatures, favorable conductivity can be obtained. The thickness of the transparent electrode can be, for example, from 30 nm to 1000 nm. In this case, a resonator structure in which the semi-transparent reflective layer is used as one end, the other end is provided in the position opposing to the semi-transparent electrode with the transparent electrode in between, and the transparent electrode is used as a resonant portion. Further, it is preferable that such a resonator structure is provided, the organic light emitting devices 20R, 20G, and 20B are covered with a protective film, and the protective film is made of a material having the refractive index almost the same as that of the material composing the transparent electrode. Thus, the protective film can become part of the resonant portion.

In addition, the invention can be also applied to a case in which the second electrode 24 is composed of a transparent electrode, the refractive index of the end face of the transparent electrode on the opposite side of the organic layer 23 is large, and a resonator structure in which the end face of the first electrode 21 on the light emitting layer 23C side is the first end, and the end face of the transparent electrode on the opposite side of the organic layer is the second end. For example, it is possible that the transparent electrode is in contact with the air layer, the refractive index of the interface between the transparent electrode and the air layer is large, and the interface is used as the second end. Otherwise, it is possible that the refractive index of the interface with the adhesive layer is large, and the interface is used as the second end. Otherwise, it is possible that the organic light emitting devices 20R, 20G, and 20B are covered with a protective film, the reflective index of the interface with the protective layer is large, and the interface is used as the second end.

It should be understood by those skilled in the art that various modifications, combinations, sub-combinations and alternations may occur depending on design requirements and other factors insofar as they are within the scope of the appended claims or the equivalents thereof.

What is claimed is:

1. A display unit comprising:

a plurality of display devices; and a plurality of light guiding parts respectively opposing each display device, each of the light guiding parts being formed of a same sealing substrate so as to be a unitary structure and having a refractive index of '$n_2$', wherein, each of the light guiding parts has a trapezoid shaped cross section, each of said light guiding parts comprises (a) a substantially planar incident face of width 'a,' said incident face being substantially parallel to a surface of each display device and proximate to each display device, and (b) an emitting face of width 'p' on an opposite side of each light guiding part, separated from the incident face by a distance 'd', sides of said light guiding parts are defined by regions of said sealing substrate where portions of said sealing substrate are absent, at least one side of each light guiding part extends from the incident face of the light guiding part to the emitting face of the light guiding part and has a reflective face, a value 'u1' represents a maximum angle of light entering the incident face, a value 'u2' represents a maximum angle of light which is reflected by the reflective face and then is emitted from the emitting face, a value α represents a view angle of each display device said view angle being less than 60 degrees, and values of '$n_2$', 'a', 'p', 'd', 'u1', and 'u2' are such so as to satisfy the following relationships $$n2 \times \sin[a\tan\{(p+a)/2d\}] < \sin\alpha, \quad (1)$$

$$n2 \times \sin(u2) < \sin\alpha, \quad (2)$$

and $$n2 \times \sin(au1/p) < \sin\alpha. \quad (3)$$

2. The display unit according to claim 1, wherein said view angle is less than 30 degrees.

3. The display unit according to claim 1, wherein the reflective face comprises a reflective film.

4. The display unit according to claim 1, wherein each display device is an organic light emitting device including an organic layer having a light emitting layer between a first electrode and a second electrode.

5. The display unit according to claim 4, wherein each of the display device has a resonator structure in which light generated in the light emitting layer is resonated between an end face of the first electrode and an end face of the second electrode.

6. The display unit according to claim 1, wherein each display device is provided on a driving substrate and the sealing substrate is oppositely arranged over a side where the display device is provided on the driving substrate.

\* \* \* \* \*